US008970362B2

(12) United States Patent
Morley et al.

(10) Patent No.: US 8,970,362 B2
(45) Date of Patent: Mar. 3, 2015

(54) VEHICLE-INTEGRATED CHILD PRESENCE AND REMINDER SYSTEM

(75) Inventors: Karen E. Morley, Troy, MI (US); John R. Dolan, Woodhaven, MI (US); Julie A. Kleinert, Fenton, MI (US); Li-Pen J. Ho, Farmington Hills, MI (US); David T. Proefke, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/448,685

(22) Filed: Apr. 17, 2012

(65) Prior Publication Data

US 2012/0268265 A1 Oct. 25, 2012

Related U.S. Application Data

(60) Provisional application No. 61/477,734, filed on Apr. 21, 2011.

(51) Int. Cl.
 *B60Q 1/00* (2006.01)
 *B60N 2/00* (2006.01)
 *B60N 2/02* (2006.01)
 *B60N 2/28* (2006.01)
 *G08B 21/22* (2006.01)

(52) U.S. Cl.
 CPC .............. *B60N 2/002* (2013.01); *B60N 2/0276* (2013.01); *B60N 2/28* (2013.01); *G08B 21/22* (2013.01)
 USPC ........ 340/457; 340/573.1; 340/438; 340/439; 340/457.1

(58) Field of Classification Search
 USPC ........ 340/573.1, 438, 439, 457.1, 522, 573.4, 340/665, 667, 668
 See application file for complete search history.

(56) References Cited

U.S. PATENT DOCUMENTS

| 5,404,128 A * | 4/1995 | Ogino et al. ................ 340/425.5 |
| 6,922,147 B1 * | 7/2005 | Viksnins et al. ........... 340/573.1 |
| 2003/0222775 A1 * | 12/2003 | Rackham et al. ............. 340/457 |

(Continued)

FOREIGN PATENT DOCUMENTS

| CN | 2777659 Y | 3/2006 |
| CN | 201004265 Y | 1/2008 |

(Continued)

OTHER PUBLICATIONS

German Office Action dated Mar. 19, 2013 for Application No. 102012206535.0, 7 pages.
Chinese Office Action for application CN 201210179244.1, mailed Mar. 26, 2014, 8 pages.

*Primary Examiner* — Daryl Pope
(74) *Attorney, Agent, or Firm* — Cantor Colburn LLP

(57) ABSTRACT

A control system for implementing a vehicle-integrated child presence and reminder system includes a computer processor. The control system is integral with a vehicle. Logic is executable by the control system and is configured to monitor an occupancy sensor activated in a vehicle. The occupancy sensor, when activated, is indicative of a presence of a child in a car seat disposed in the vehicle. The logic is also configured to collect data from at least one vehicle sensor and, using the data collected from the vehicle sensor along with results of the monitoring of the occupancy sensor, the logic determines if a triggering event has occurred. In response to determining the triggering event has occurred, the logic is configured to generate an alert and transmit the alert to an alert component.

17 Claims, 2 Drawing Sheets

(56) References Cited

U.S. PATENT DOCUMENTS

| | | | |
|---|---|---|---|
| 2006/0103516 A1* | 5/2006 | Zang | 340/457 |
| 2009/0079557 A1* | 3/2009 | Miner | 340/457.1 |
| 2009/0212955 A1 | 8/2009 | Schoenberg et al. | |
| 2010/0090836 A1* | 4/2010 | Trummer | 340/573.1 |
| 2011/0080288 A1* | 4/2011 | Younse | 340/573.1 |

FOREIGN PATENT DOCUMENTS

| | | |
|---|---|---|
| CN | 101987595 A | 3/2011 |
| DE | 102004044220 A1 | 4/2005 |
| DE | 102009036488 A1 | 2/2011 |
| DE | 102011007584 A1 | 11/2011 |

\* cited by examiner

VEHICLE-INTEGRATED CHILD PRESENCE AND REMINDER SYSTEM

CROSS-REFERENCE TO RELATED APPLICATIONS

This patent application claims priority to U.S. Provisional Patent Application Ser. No. 61/477,734 filed Apr. 21, 2011, which is incorporated herein by reference in its entirety.

FIELD OF THE INVENTION

The subject invention relates to data processing and, more particularly, to a vehicle-integrated child presence and reminder system.

BACKGROUND

Car manufacturers continuously introduce to market new vehicle features in an effort to promote safe driving behaviors. Even the most careful drivers can benefit from the added security technology brings to vehicle safety in terms of features, such as back-up alarm systems and video cameras that display otherwise hidden obstacles that are in proximity of a vehicle. Drivers with infants or toddlers typically secure them into specially made car seats that provide protection in the event of an accident. When faced with extraordinary distractions or upon straying from an everyday routine, oftentimes people inadvertently make unsafe decisions that can impact their safety as well as those in the family. Upon arriving at a destination, a pre-occupied parent may forget an infant who is quietly sleeping out of sight in the backseat of a vehicle. In fact, hyperthermia or heat-related deaths are the third most frequent cause of automotive non-traffic child deaths after back-over and front-over incidents.

Accordingly, it is desirable to provide a way to remind individuals of the presence of a child left in a vehicle.

SUMMARY OF THE INVENTION

In an exemplary embodiment of the invention, a system for implementing a vehicle-integrated child presence and reminder system is provided. The system includes a control system implementing a computer processor. The control system is integral with a vehicle. The system also includes logic executable by the control system. The logic is configured to implement a method. The method includes monitoring an occupancy sensor activated in a vehicle. The occupancy sensor, when activated, is indicative of a presence of a child in a car seat disposed in the vehicle. The method also includes collecting data from at least one vehicle sensor and, using the data collected from the vehicle sensor as well as results of the monitoring of the occupancy sensor, determines if a triggering event has occurred. In response to determining the triggering event has occurred, the method includes generating an alert, and transmitting the alert to an alert component.

In another exemplary embodiment of the invention, a method for implementing a vehicle-integrated child presence and reminder system is provided. The method includes monitoring an occupancy sensor activated in a vehicle. The occupancy sensor, when activated, is indicative of a presence of a child in a car seat disposed in the vehicle. The method also includes collecting data from at least one vehicle sensor and, using the data collected from the vehicle sensor as well as results of the monitoring of the occupancy sensor, determines if a triggering event has occurred. In response to determining the triggering event has occurred, the method includes generating an alert, and transmitting the alert to an alert component.

In a further exemplary embodiment of the invention, a computer program product for implementing a vehicle-integrated child presence and reminder system is provided. The computer program product includes a storage medium embodied with instructions, which when executed by a computer, causes the computer to implement a method. The method includes monitoring an occupancy sensor activated in a vehicle. The occupancy sensor, when activated, is indicative of a presence of a child in a car seat disposed in the vehicle. The method also includes collecting data from at least one vehicle sensor and, using the data collected from the vehicle sensor as well as results of the monitoring of the occupancy sensor, determines if a triggering event has occurred. In response to determining the triggering event has occurred, the method includes generating an alert, and transmitting the alert to an alert component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the disclosure, its application or uses.

In accordance with an exemplary embodiment, a vehicle-integrated child presence and reminder system and process is provided. The vehicle-integrated child presence and reminder system (also referred to herein as "integrated system") acquires sensor data from a vehicle and applies logic to this vehicle sensor data, as well as data from a sensor attached to the child seat, to determine when to generate an alert or reminder that a child has been left in the vehicle. The integrated system may be implemented without costly system and network infrastructure components. The integrated system may be configured by an end user (e.g., vehicle owner or driver) to generate alerts in a customized manner, as will be described further herein.

Figure 1:
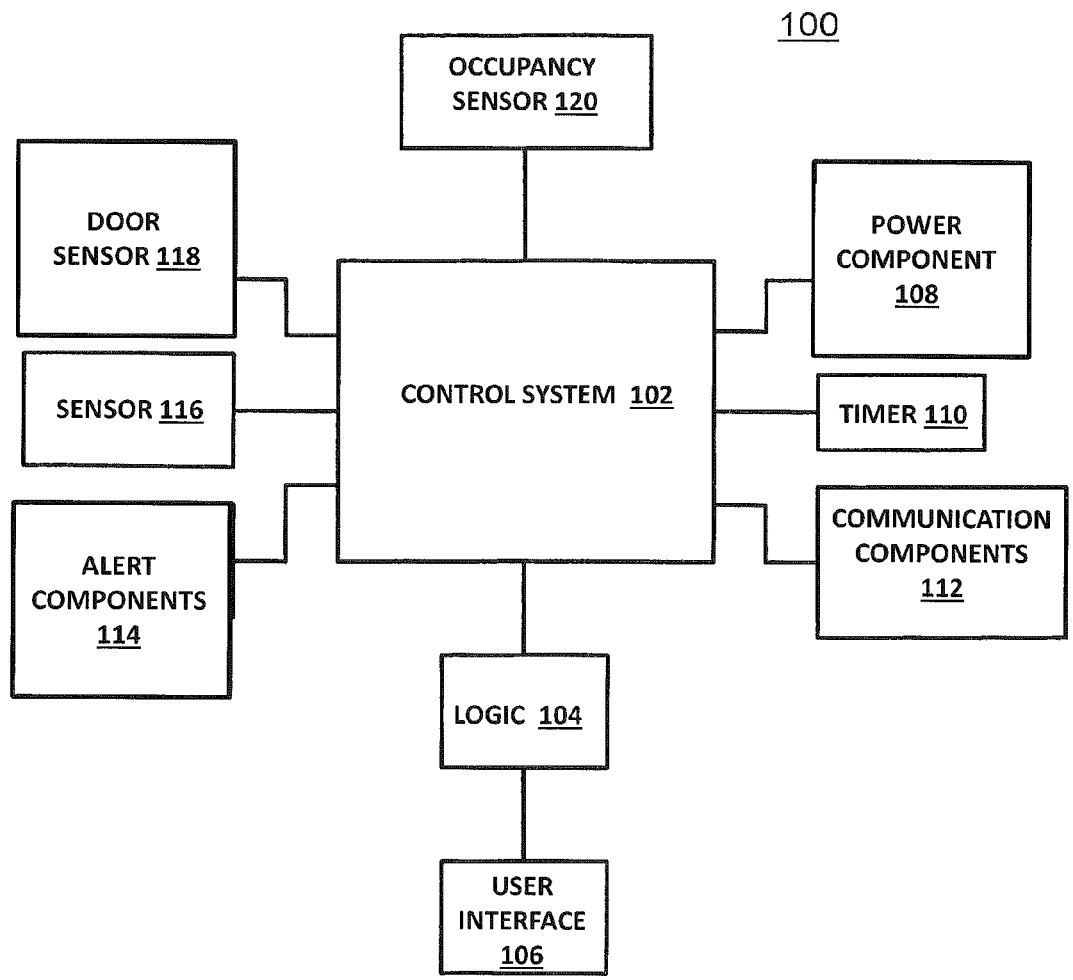
FIG. 1 is a block diagram of a system upon which vehicle-integrated child presence and reminder processes may be implemented in accordance with an exemplary embodiment.

Turning now to FIG. 1, a system 100 upon which the vehicle-integrated child presence and reminder process may be implemented will now be described in an exemplary embodiment. The system 100 of FIG. 1 illustrates various vehicle components for a vehicle (not shown). In an exemplary embodiment, the system 100 includes a control system 102 that executes logic 104 for performing the exemplary vehicle-integrated child presence and reminder process described herein. The logic 104 includes a user interface 106.

The control system 102 includes a computer processor that manages the operation of the vehicle by communicating with various vehicle components, such as the engine (not shown), exhaust system (not shown), audio system (not shown), and other components of the vehicle, such as those illustrated in FIG. 1. The control system 102 aggregates data collected from the vehicle components and applies the logic 104 to the data to determine when to generate an alert.

The vehicle may include any type of automobile, e.g., minivan, sedan, coupe, pickup truck, etc. The vehicle includes a power, or ignition, component 108 that powers the vehicle in preparation for transport. The power component 108 communicates its status, whether powered on or off, to the control system 102. In addition, a timer 110 may be used by the logic 104 to monitor time events, as will be described further herein.

The vehicle further includes communication components 112, such as a global positioning system (GPS) device, navigation system for communicating with digital satellite and/or radio stations, or other communication networking system, e.g., through a wireless service provider as a subscription-based service, such as OnStar®. In addition, the communication components 112 may also include wireless communications, e.g., using wireless communication protocols, such as BlueTooth™.

The vehicle of system 100 also includes sensors that monitor and collect data from various vehicle components. For example, a door sensor 118 may track the opening and closing status of a door of the vehicle, and the status is communicated to the control system 102. In addition, a sensor 116 tracks the vehicle speed and communicates this information to the control system 102. Other sensors of the vehicle may be employed by the integrated system of FIG. 1. For example, a temperature sensor (not shown) may be used to collect temperature data that is communicated to the control system 102 and used by the logic 104 in determining when to generate an alert.

The vehicle also includes one or more alert components 114 for outputting the alert. The alert components 114 may be existing vehicle components, such as the horn (not shown), audio system (not shown), lights (not shown), key fob (not shown), etc. Alternatively, or in conjunction with the above-referenced alerts, the alert components 114 may include a cellular telephone or other communications device configured by the logic 104 for transmitting the alert (e.g., via communication components 112).

The control system communicates with an occupancy sensor 120, which is installed or disposed on a child car seat restraint system or seatbelt of the vehicle. The occupancy sensor 120 transmits a signal (e.g., via Bluetooth™) to the control system 102 when it becomes engaged or activated, as well as when it becomes disengaged, or deactivated. In one alternative embodiment, a portion of the functionality of the logic 104 may be incorporated into the child car seat (e.g., where the car seat may include a controller that transmits information, such as the occupancy sensor 120 information wirelessly to the control system 102 via communication components 112).

As indicated above, the exemplary integrated system monitors vehicle data and determines when to generate an alert. The logic 104 may be configured by an end user via the user interface 106 to establish criteria for when an alert may be generated, as well as how and where the alert is transmitted. The user interface 106 may be implemented through an existing vehicle component, such as a navigation system (e.g., using the display and input controls), a programmable key fob of the vehicle, OnStar™, or similar means. The user interface 106 may also be implemented through a cellular interface such as a Smartphone application. The user interface 106 receives the end user's inputs and transmits the data to the logic 104, which is processed by the control system 102 and used in monitoring the various vehicle sensors, as described herein.

Figure 2:
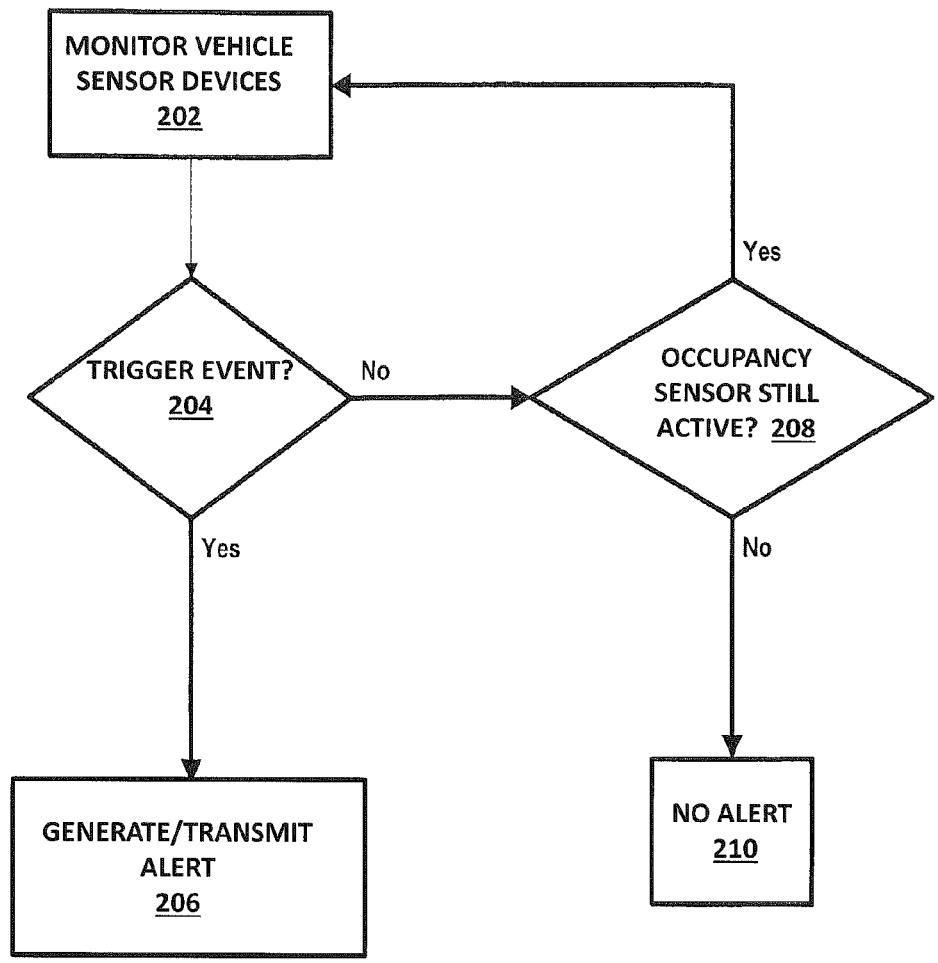
FIG. 2 is a flow diagram illustrating a process for implementing a vehicle-integrated child presence and reminder system in accordance with an exemplary embodiment.

Turning now to FIG. 2, an exemplary process for implementing the vehicle-integrated child presence and reminder system will now be described. The process described in FIG. 2 assumes that the occupancy sensor 120 has been activated (i.e., reflecting the presence of a child or infant in the car seat), the vehicle power is on, and the logic 104 is initiated. It will be understood that there may be situations when the logic 104 is not required, e.g., when the vehicle is not transporting a child, and the logic 104 may be disarmed.

At step 202, the control system 102 monitors the vehicle sensor devices (e.g., the door sensor 118, the vehicle speed sensor 116, occupancy sensor 120, and optionally, a temperature sensor (not shown). The sensor data is processed by the logic 104 to determine if a triggering event has occurred at step 204. The triggering event may be configurable parameter that is based on the user inputs to the user interface 106 when configuring the features of the integrated system. For example, the end user may configure the logic 104 to generate an alert if the power of the vehicle has been turned off (as determined by the power component 108), the door sensor 118 indicates the driver side door has been opened, and the occupancy sensor 120 is active for a period of time (e.g., three minutes), as measured by the timer 110. These events are indicative of a driver who has exited the vehicle while leaving a child in the car seat. The configurable wait (e.g., three-minute or other) provides the driver with ample opportunity to remove the child from the car seat, thereby preventing a false alert.

At step 204, if the triggering event has occurred, the logic 104 generates an alert and transmits the alert to an output device at step 206. In an exemplary embodiment, the logic 104 may be configured via the user interface 106 to select one or more vehicle components through which the alert will be enabled. For example, the end user may select the vehicle's horn for outputting the alert. The horn may sound one or more beeps to alert the driver of the forgotten child. Other components may be selected for enabling the alert, such as the vehicle's lights may flash, the audio system in the vehicle may be powered on or increased in volume, etc. In other embodiments, the logic may be configured to enable the end user to enter a cell phone number or other communications address to which an alert is transmitted. The communications address may be stored by the logic 104 via the control system 102. Any of the above alert configurations may be combined or coupled together to ensure the driver is successfully alerted to the child's presence in the vehicle.

Returning now to step 204, if the triggering event has not occurred, the logic 104 determines if the occupancy sensor 120 is still active at step 208. In this manner, the logic 104 continuously monitors the status of the occupancy sensor 120 to determine if the child has been removed from the seat. If the child has been intentionally removed from the seat, thereby deactivating the occupancy sensor 120, the logic 104 would not generate the alert at step 210. In an alternative embodiment, the logic 104 may be configured to generate an alert when the occupancy sensor 120 is deactivated under certain conditions. For example, the driver may wish to configure the logic 104 to generate an alert when the child removes him/herself from the car seat. In this embodiment, the logic 104 is configured to monitor for the deactivation of the occupancy sensor 120 while the vehicle is in gear (e.g., by monitoring the vehicle speed sensor 116). Once the vehicle is powered off and the occupancy sensor 120 is deactivated, the logic 104 may be configured to be disarmed.

In one embodiment, the integrated system may be configured to monitor or perform self-diagnostic functions for determining system faults. For example, self-diagnostic functions may include assessing whether an occupant is seen in the car seat or determining when the battery power on the occupancy sensor 120 is low. These and other information can be communicated to the control system 102, which in turn may generate and transmit an alert to the driver or other individual. The alert may be configured for output to any of the vehicle components, such as those described above, or may be output to a communications device of the driver, such as a cellular telephone, Smart phone, or similar device.

Technical effects include the ability to acquire vehicle related sensor data to determine when a child has been left in a car seat of a vehicle and generate an alert notifying an individual of the presence of the child in the vehicle. The invention acquires and processes this data without costly system and network infrastructure components.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system for implementing a vehicle-integrated child presence and reminder system, comprising:
    a control system implementing a computer processor, the control system integral with a vehicle;
    an occupancy sensor disposed in a car seat of the vehicle, the occupancy sensor communicatively coupled to the control system over a wireless network; and
    logic executable by the control system, the logic configured to:
        monitor, over the wireless network, the occupancy sensor activated in the vehicle, the occupancy sensor, when activated, indicative of a presence of a child in the car seat;
        collect data from at least one vehicle sensor;
        using the data collected from the at least one vehicle sensor and results of the monitor of the occupancy sensor to determine if a triggering event has occurred; and
        responsive to determining the triggering event occurred, generate an alert, and transmit the alert to an alert component; and
        monitor, over the wireless network, a status of available battery power of the occupancy sensor, and communicate the status over the wireless network to the control system;
    wherein the at least one vehicle sensor includes a vehicle speed sensor indicative of a current operating speed of the vehicle.

2. The system of claim 1, wherein the at least one vehicle sensor includes a door sensor indicative of one of a presence and absence of an individual.

3. The system of claim 1, wherein the triggering event is determined based on user-configurable parameters using an interface associated with the logic.

4. The system of claim 3, wherein the interface is implemented via a navigation system of the vehicle.

5. The system of claim 3, wherein the user-configurable parameters defining the triggering event further include parameters for determining an output device through which the alert is generated, the output device including at least one of a vehicle horn, vehicle lighting, and vehicle audio system.

6. The system of claim 3, wherein the user-configurable parameters defining the triggering event further include parameters for determining an output device through which the alert is generated, the output device including a cellphone, wherein the logic receives and stores a communications address of the cellphone, and uses the communications address to transmit the alert.

7. A method for implementing a vehicle-integrated child presence and reminder system, comprising:
    monitoring, via a control system that is integral with a vehicle, an occupancy sensor disposed in a car seat of the vehicle, the occupancy sensor communicatively coupled to the control system over a wireless network, and the occupancy sensor indicative of one of a presence and an absence of a child in the car seat;
    collecting data from at least one vehicle sensor;
    using the data collected from the at least one vehicle sensor and results of the monitoring of the occupancy sensor to determine if a triggering event has occurred; and
    responsive to determining the triggering event occurred, generating an alert, and transmitting the alert to an alert component; and
    monitoring, over the wireless network, a status of available battery power of the occupancy sensor, and communicating the status over the wireless network to the control system;
    wherein the at least one vehicle sensor includes a vehicle speed sensor indicative of a current operating speed of the vehicle.

8. The method of claim 7, wherein the at least one vehicle sensor includes a door sensor indicative of one of a presence and absence of an individual.

9. The method of claim 7, wherein the triggering event is determined based on user-configurable parameters using an interface associated with the logic.

10. The method of claim 9, wherein the interface is implemented via a navigation system of the vehicle.

11. The method of claim 9, wherein the user-configurable parameters defining the triggering event further include parameters for determining an output device through which the alert is generated, the output device including at least one of a vehicle horn, vehicle lighting, and vehicle audio system.

12. The method of claim 9, wherein the user-configurable parameters defining the triggering event further include parameters for determining an output device through which the alert is generated, the output device including a cellphone, wherein the logic receives and stores a communications address of the cellphone, and uses the communications address to transmit the alert.

13. A computer program product for implementing a vehicle-integrated child presence and reminder system, the computer program product comprising a storage medium having instructions embodied thereon, which when executed by a computer, cause the computer:

monitor an occupancy sensor disposed in a car seat of a vehicle, the occupancy sensor communicatively coupled to the computer over a wireless network, and the occupancy sensor indicative of one of a presence and an absence of a child in the car seat;

collect data from at least one vehicle sensor;

using the data collected from the at least one vehicle sensor and results of the monitor of the occupancy sensor to determine if a triggering event has occurred; and responsive to determining the triggering event occurred, generate an alert, and transmit the alert to an alert component;

monitoring, over the wireless network, a status of available battery power of the occupancy sensor, and communicating the status over the wireless network to the control system;

wherein the at least one vehicle sensor includes a vehicle speed sensor indicative of a current operating speed of the vehicle.

14. The computer program product of claim 13, wherein the at least one vehicle sensor includes a door sensor indicative of one of a presence and absence of an individual.

15. The computer program product of claim 13, wherein the triggering event is determined based on user-configurable parameters using an interface associated with the logic.

16. The computer program product of claim 15, wherein the interface is implemented via a navigation system of the vehicle.

17. The computer program product of claim 15, wherein the user-configurable parameters defining the triggering event further include parameters for determining an output device through which the alert is generated, the output device including at least one of a vehicle horn, vehicle lighting, and vehicle audio system.

* * * * *